United States Patent Office 3,036,971
Patented May 29, 1962

3,036,971
LUBRICATING OILS CONTAINING CARBONATED BASIC SULFURIZED CALCIUM PHENATES
Ferdinand P. Otto, Woodbury, N.J., assignor to Socony Mobil Oil Company, Inc., a corporation of New York
No Drawing. Filed Dec. 24, 1958, Ser. No. 782,660
8 Claims. (Cl. 252—42.7)

This invention relates to improved lubricating oils for internal combustion engines and is particularly concerned with the improvement of the detergent and antioxidant characteristics of such oils.

Still more particularly, the invention is concerned with the improvement of the detergent and antioxidant ability of a particular class of compounds which have been recognized in the prior art as highly effective detergent additives for lubricating oils, viz., the "basic sulfurized calcium phenates." These compounds are fully disclosed in U.S. Patent No. 2,680,096.

As shown in Patent No. 2,680,096, the basic sulfurized calcium phenates contain a ratio of equivalents of calcium to equivalents of phenol which is substantially greater than that of the corresponding "normal" sulfurized calcium phenates. Thus, they contain up to about two full equivalents of calcium per equivalent of phenol as compared to the corresponding normal salts which contain only one equivalent of calcium per equivalent of phenol. On a percentage basis, therefore, the basic sulfurized calcium phenates contain up to 100%, or more, of calcium over that contained in the corresponding normal salts. The prior art has recognized that the excess calcium contents of these basic salts makes them more effective detergent additives on a weight for weight basis than the normal salts.

It has now been found, however, in accordance with the present invention, that the effectiveness of the basic sulfurized calcium phenates as lubricating oil detergents can be even further substantially enhanced by treatment of the basic salts with carbon dioxide, as hereinafter described. The carbonation treatment, furthermore, substantially improves the normal antioxidant properties of the basic salts. These improvements are particularly advantageous when the additives are used in lubricating oils employed for the lubrication of internal combustion engines, particularly diesel engines operated on high-sulfur fuel.

Accordingly, it is an object of this invention to provide a new and improved class of engine oil additives, viz., the carbonated derivatives of basic sulfurized calcium phenates. It is also an object to provide lubricating oil compositions containing these new additives. Other and further objects of the invention will be apparent from the following detailed description thereof.

Referring again to the disclosure of Patent No. 2,680,096, it is seen that the basic sulfurized calcium phenates are prepared from either normal calcium phenates or from phenols as starting materials. When phenols are used as the starting material they are treated with calcium oxide or hydroxide to form the desired normal calcium phenates, which are then treated further with calcium oxide or hydroxide and sulfur in the presence of glycols to form the sulfurized basic calcium phenates. On the other hand, it is an aspect of the invention disclosed in the patent that the phenols may be treated with calcium oxide or hydroxide and sulfur in amounts sufficient to form the sulfurized basic calcium phenates, directly, i.e., without the initial formation and separation of the normal calcium phenates, by reaction of the phenols with the calcium oxide or hydroxide and sulfur in the presence of glycols.

As disclosed in the patent, the term "phenol" means phenol and derivations of phenol, while the term "calcium phenate" means calcium salts of phenol and derivatives of phenol.

As further disclosed in the patent, the normal calcium phenates which are to be reacted with sulfur to form the sulfurized calcium phenates, are of the formula:

$$[(R)_aAO]_2Ca$$

wherein A is an "essentially hydrocarbon" aromatic radical, preferably a benzene radical, R is a cyclic, straight-chained or branched-chained, saturated or unsaturated, essentially hydrocarbon radical having from 4 to 30 carbon atoms, O represents oxygen, $a$ is a number having a value of 1 to 5.

In accordance with the patent, by "essentially hydrocarbon" radical is meant those radicals which are composed mainly of hydrogen and carbon, and include such radicals which contain, in addition, minor amounts of substituents, such as chlorine, bromine, oxygen, sulfur, nitrogen, etc., which do not substantially affect their hydrocarbon character.

Examples of suitable hydrocarbonaceous radicals include alkyl radicals, such as butyl, hexyl, octyl, decyl, dodecyl, hexadecyl, eicosyl and triacontyl; radicals derived from petroleum hydrocarbons, such as white oil, wax, olefin polymers, e.g., polypropylene, polybutylene, etc.; aryl radicals, such as phenyl, naphthyl, etc., aralkyl radicals, such as phenyloctyl, phenyldecyl, phenloctadecyl, etc.; alkaryl radicals, such as amylphenyl, cetylphenyl, etc.; and cyclic non-benzenoid radicals, such as cyclohexyl, bornyl, etc.

Examples of calcium phenates include the calcium salts of octyl phenol, decyl phenol, dodecyl phenol, tetradecyl phenol, hexadecyl phenol, triacontyl phenol, etc.

The glycols used as the solvent to prepare the sulfurized calcium phenates in accordance with the invention of the patent may contain up to 6 carbon atoms. Suitable glycols include: ethylene glycol, propylene glycol, butane diol-2,3; pentane diol-2,3; and 2-methyl butane diol-3,4. Because of the higher yield of product obtained, ethylene glycol is the preferred solvent.

The preparation of a sulfurized basic calcium alkyl phenate, according to the process of the patent, is effected by mixing together the alkyl phenol or normal calcium phenate, calcium oxide or hydroxide, elemental sulfur and glycol.

The amount of elemental sulfur present in the reaction mixture can vary from 10 mol percent to 200 mol percent (based on the calcium). However, it is preferred to use from 50 to 125 mol percent (based on calcium).

The amount of calcium oxide or hydroxide used is that amount which will be sufficient to incorporate in the basic sulfurized calcium phenate an amount of calcium up to and greater than 100% more calcium than that which is present in the normal calcium phenates. The amount of calcium oxide or hydroxide used in the reaction depends somewhat on the amount of calcium desired in the product in excess of that of the normal phenates, and, as noted hereinbelow, also depends on the weight ratio of glycol to calcium oxide or hydroxide used. Normally, in the preparation of a basic sulfurized calcium phenate, a slight excess (e.g., 10 mol percent excess) of calcium oxide or hydroxide is used in the reaction over that desired in the final basic phenate product.

The patent states that the amount of glycol used depends in part upon the nature of the glycol itself which is used, and, as noted above, on the amount of calcium oxide or hydroxide used. In general, the use of low molecular weight glycols (e.g., ethylene glycol) results in the obtainment of a higher yield of the basic phenate than does the use of higher molecular weight glycols (e.g., propylene glycol) when both are used in the same amounts by weight. The amount of glycol used is also governed by the solubility of the acidic substance (the phenols or calcium phenates) and the calcium oxide and hydroxide in the glycol.

It is preferred in conducting the reaction to select a glycol in which phenols, normal phenates and calcium oxides and hydroxides have the greatest solubility.

A sufficient amount of glycol is employed to bring the reactants into efficient contact for substantial reaction in a reasonably short time. That is, the amount of glycol used is sufficient to dissolve a portion of each of the reactants and to cause substantial contact between said reactants. For this purpose, it is beneficial to use certain ratios by weight of the glycol to the calcium oxide or hydroxide, which ratio may be from about 50 to 1 to about 1 to 1; 25 to 1 to about 2 to 1 being preferred.

The temperatures at which the reactants will react in the presence of glycols are dependent to a large extent on the nature of the phenolic substance (i.e., the phenols or the neutral calcium phenates), the calcium oxide or hydroxide and the glycols. Although the reaction may take place at atmospheric pressure, it is desirable that it take place at reduced pressures. Thus, it is preferred to use the minimum temperatures at which the reaction will take place at reduced pressures, the reduced pressure and the temperature to be guided by the glycol used. It is preferred to use a pressure substantially less than atmospheric pressure; that is, it is preferred to use a reduced pressure in order that the glycol may be distilled off from the mixture at a temperature less than 400° F. Thus, the maximum temperature of the reaction is about 400° F. with a minimum temperature of about 200° F.

As further disclosed in the patent, in conducting the reaction it is preferred to incorporate lubricating oil in the mixture because the resulting lubricating oil solution is then readily usable as a base for the preparation of useful lubricating oil compositions. Also, the presence of the lubricating oil decreases the viscosity of the mixture and facilitates the handling of the reaction mixture.

Lubricating oils which may be used for this purpose include a wide variety of lubricating oils such as naphthenic base, paraffin base, and mixed base mineral oils, other hydrocarbon lubricants, e.g., lubricating oils derived from coal products and synthetic oils, e.g., alkylene polymers (such as polymers of propylene, butylene, etc., and mixtures thereof), alkylene oxide type polymers, dicarboxylic acid esters and liquid esters of acids of phosphorus. Synthetic oils of the alkylene oxide type polymer which may be used include those exemplified by alkylene oxide polymers (e.g., propylene oxide polymers) and derivatives, including alkylene oxide polymers prepared by polymerizing alkylene oxides (e.g., propylene oxide) in the presence of water or alcohols, e.g., ethyl alcohol, and esters of alkylene oxide type polymers, e.g., acetylated propylene oxide polymers prepared by acetylating the propylene oxide polymers containing hydroxyl groups.

CARBONATION OF THE SULFURIZED BASIC CALCIUM PHENATE

In accordance with the present invention, the sulfurized basic calcium phenates shown in Patent No. 2,680,096, as discussed hereinabove, are subjected to treatment with carbon dioxide to form carbon dioxide-containing derivatives thereof which exhibit markedly improved detergent characteristics over the uncarbonated materials when employed as additives in engine lubricating oils.

In accordance with the present invention, the carbonation of the sulfurized basic calcium phenate salt is carried out by dissolving the salt in a suitable diluent, such as a mineral oil, heating the solution to a temperature of from about 200° F. to about 400° F. and passing carbon dioxide through the heated solution for a time sufficient to incorporate from about 0.2 mol to about 0.6 mol of carbon dioxide per mol of calcium into the basic salt.

The following examples illustrate the preparation of a typical sulfurized basic calcium phenate salt, viz., the basic sulfurized calcium phenate of propylene tetramer-substituted phenol (Example I) after the fashion of the disclosure of Patent No. 2,680,096, and the preparation of the carbonated derivative thereof in accordance with the present invention (Example II).

EXAMPLE I

*(a) Preparation of Propylene Tetramer-Alkylated Phenol*

A mixture consisting of 300 parts, by weight, of phenol, 555 parts, by weight, of a polypropylene comprised essentially of propylene tetramer (average M.W.=170) and 45 parts, by weight, of acid-treated clay were heated at 300° F. for a period of 12 hours after which time the mixture was filtered. The filtered mixture was then heated to 530° F. to remove unreacted phenol and olefin polymers. The resulting propylene tetramer-alkylated phenol product had a boiling range of 560° F. to 700° F.

*(b) Preparation of Sulfurized Basic Calcium Phenate of Propylene Tetramer-Alkylated Phenol*

A mixture of 600 parts, by weight, of the alkylated phenol product of (a), above, 173 parts, by weight, of calcium hydroxide, 58 parts, by weight, of sulfur and 300 parts, by weight, of ethylene glycol was heated at 300° F. with agitation at an absolute pressure of 300 millimeters of mercury. After the water of reaction had been distilled off, the pressure was reduced to 60 millimeters of mercury and the temperature raised to 380° F., at which temperature and pressure the ethylene glycol was removed. During the period when the ethylene glycol was being removed, 1000 parts, by weight, of petroleum lubricating oil were added. When all of the ethylene glycol had been removed, the mixture was cooled and 200 parts, by weight, of a petroleum thinner were added and the mixture was filtered. The filtrate was heated at reduced pressure to remove the petroleum thinner. The final lubricating oil solution (containing about 40% of the basic calcium salt product) analyzed 2.9% sulfur and 4.4% calcium; the basic sulfurized calcium alkyl phenate containing about 70% more calcium than that present in the corresponding normal calcium alkyl phenate.

EXAMPLE II

*Preparation of Carbonated, Sulfurized Basic Calcium Phenate of Propylene Tetramer-Alkylated Phenol*

Thirty gallons of a product prepared as in Example I and having sulfur and calcium contents similar thereto was charged to a 50-gallon steam heated, glass-lined kettle.. The additive was heated to a temperature of 300° F. and constantly agitated with an anchor type stirrer, while carbon dioxide was introduced into the liquid through a ¼" copper tube at a rate of 10 pounds per hour. This treatment was continued for four hours.

Samples taken hourly showed no evidence of deposits, or change in clarity. $CO_2$ contents were as follows.

| Hours: | Percent $CO_2$ combined in additive |
|---|---|
| 0 | 0.1 |
| 1 | 1.4 |
| 2 | 1.6 |
| 3 | 1.7 |
| 4 | 1.9 |

*Analysis of 4-hour product:*
Percent Ca=4.4
Percent $CO_2$=1.9
K.V. at 210° F., cs.=25.05
Percent S=2.8

The marked improvement in the detergent and antioxidant ability of the sulfurized basic calcium phenate salts effected by the carbonation treatment thereof in accordance with the present invention is illustrated by the following tests in which the performance of lubricating oil blends of the uncarbonated and carbonated sulfurized basic calcium phenate salts were compared.

(1) Caterpillar Engine Detergency Test

This is a full-scale engine test which determines the ability of an oil in preventing piston deposits. A single-cylinder, 4-cycle, super-charged, Caterpillar diesel engine is used. The engine is operated on a diesel fuel containing 1% sulfur under the following conditions:

Oil temperature_____ 175° F.±5.
Jacket temperature_____ 200° F.±5.
Speed_____ 1200 r.p.m.
Brake load_____ 42 H.P.
Supercharge_____ 44 in. Hg (abs.).

Six quarts of oil are charged to the engine at the start of the test and the oil is changed at 120-hour intervals. The duration of the test is 240 hours. The condition of the piston at the end of the test is observed and is expressed by a piston cleanliness rating based on a scale from 0 to 100, a 100 rating signifying the cleanest possible piston. Lacquer demerits and the extent of top-groove carbon packing are also noted.

The base oil used in the tests was a 50–50 mixture of coastal distillate and coastal bright stock having a K.V. at 210° F. of 16.5 cs. and at 100° F. of 265 cs.

The test results are given in Table I. It will be seen from these test results that although the uncarbonated salt (Example I) is an effective detergent, the carbonated salt (Example II) is markedly superior to the uncarbonated salt in all respects.

TABLE I.—CATERPILLAR DETERGENCY TEST

| Additive Used | Concn., Wgt. Percent | Piston Cleanliness Rating | Lacquer Demerits | Top Groove Packing |
|---|---|---|---|---|
| Example I | 32 | 95.3 | 2.1 | 21.0 |
| Example II | 32 | 98.3 | 0.8 | 4.0 |

(2) Oxidation Test

This test determines the effectiveness of an oil additive in preventing catalytic oxidation of the oil. This test is conducted as follows: A 25 cc. sample of the oil is placed in a 200 x 25 mm. test tube with 15.6 square inches of sand-blasted iron wire, 0.78 square inch of polished copper wire, 0.87 square inch of polished aluminum wire and 0.167 square inch of polished lead surface. The oil is heated to 260° F. and dry air is passed through it at a rate of 10 liters per hour for a period of 40 hours. The viscosity of the oil is determined before and after the test as a measure of the extent to which the oil is oxidized during the test. Thus, the greater the increase in the viscosity of thet oil the greater the deterioration of the oil.

The results of this test are given in Table II. It is seen from these results that the extent of oxidation of the oil containing the carbonated additive (Example II) was considerably less (40% viscosity increase) than that with the uncarbonated additive (48% viscosity increase).

The base oil used in these tests was the same as that used in the Caterpillar detergency tests.

TABLE II.—OXIDATION TEST

Additive used: Percent viscosity increase
 Example I_____ 48
 Example II_____ 40

(3) Panel Coker Test (U.S. Steel Method—Federal Standards Apparatus 3462-5)

This test determines the tendency of an oil to form solid decomposition products in contact with surfaces at elevated temperatures. The "coking value" determined in the test is indicative of the high temperature oxidation stability of an oil. Briefly, the test is as follows: A tared, polished aluminum test panel is placed in the coking apparatus in a position such that the polished surface thereof is exposed to contact with oil thrown against it by means of a splasher immersed in the oil. The test panel and the oil are heated to a temperature of 600° F. and maintained at this temperature while the splasher is operated for a period of 24 hours, after which the panel is removed, cooled, washed with petroleum ether, dried and reweighed. The difference in weight before and after the test is reported as the "coking value."

The results obtained in this test are shown in Table III. It will be observed that, whereas the uncarbonated salt (Example I) permitted considerable deterioration of the base oil, as reflected by the 133 mgs. of deposit on the test panel, the carbonated salt (Example II) protected the oil from any significant deterioration, no measurable deposits being formed on the test panel.

The base oil used in these tests was an S.A.E. 30 grade naphthenic base oil (K.V. at 210° F.=9.72 cs., K.V. at 100° F.=111.2 cs.; V.I.=63).

TABLE III.—PANEL COKER TEST

Additive used: Panel deposit (mgs.)
 Example I_____ 133
 Example II_____ Nil

It will be appreciated that the carbonated sulfurized basic calcium phenates of this invention are ordinarily prepared in the form of concentrated oil solutions thereof, which are blended as such with the lubricating oil stocks to form finished lubricating oils. The concentration of the product salts in these product oil concentrates will, of course, differ depending upon the amount of diluent oil used in their preparation. However, these differences can be eliminated by standardization of process conditions, such as the amount of oil diluent used, or by final adjustment of the product oil solution to some standard salt content as will be readily appreciated by those skilled in the art. Expressed on the basis of actual salt concentration, i.e., on an oil-free basis, therefore, the amount of the product salts may be incorporated into finished lubricating oils in amounts ranging from about 0.5% to about 20%, by weight, the lower amounts within this range, i.e., from about 1% to about 10%, being most suitable for oils designed for the lubrication of gasoline engines and the higher amounts, i.e., above about 10%, being particularly suitable for diesel engine oils, particularly oils for diesel engines operated on high sulfur content (1% to 5% sulfur) fuels. It will be understood that the amounts of the additive salts set forth in the accompanying oil composition claims are expressed on an oil-free basis.

The sulfurized basic calcium phenates of the invention may be added to lubricating oils containing other additives designed to improve the various characteristics thereof, such as pour point depressants, viscosity index improvers, defoamants, rust preventatives, other detergents, etc.

Although the invention has been described herein by means of certain specific embodiments and illustrative examples, it is not intended that it be limited in any way thereby, but only as indicated in the following claims.

What is claimed is:

1. As a new composition of matter a carbon dioxide derivative of a basic sulfurized calcium alkyl phenate salt prepared by the method which comprises the steps of (1) forming a reaction mixture of (a) a phenolic material selected from the group consisting of alkyl-substituted phenols having up to 30 carbon atoms in an alkyl substituent thereof, and normal calcium salts of said phenols, (b) a calcium base selected from the group consisting of calcium oxide and calcium hydroxide, in an amount sufficient to form a basic sulfurized calcium alkyl phenate having a calcium content up to about 100% in excess of that present in the corresponding normal calcium phenate, (c) elemental sulfur in an amount of from 10 to 200 mol percent based on calcium and (d) a glycol containing less than 6 carbon atoms, the weight ratio of said glycol to said calcium base used being from 1 to about 50, (2) heating the reaction mixture to a temperature sufficient to form said basic sulfurized calcium alkyl phenate salt and remove water of reaction and glycol from the reaction mixture, (3) adding a mineral oil diluent to the reaction mixture and (4) passing carbon dioxide gas into the reaction mixture while maintaining the temperature of said mixture between about 200° F. and about 400° F., for a time sufficient to incorporate into the basic sulfurized calcium alkyl phenate product from about 0.2 mol to about 0.6 mol of carbon dioxide per mol of calcium in said product.

2. A carbon dioxide derivative of a basic sulfurized calcium alkyl phenate prepared by the method of claim 1, but wherein steps 2 and 3 are conducted by adding at least a part of the mineral oil diluent to the reaction mixture before all of the glycol has been removed from said reaction mixture.

3. A carbon dioxide derivative of a basic sulfurized calcium alkyl phenate prepared by the method of claim 1, but wherein in steps 2 and 3 the temperature of the reaction mixture is maintained between about 200° F. and about 400° F. and the pressure is below atmospheric.

4. As a new composition of matter, a carbon dioxide derivative of a basic sulfurized calcium phenate of propylene tetramer-alkylated phenol, prepared by the method which comprises the steps of: (1) forming a reaction mixture of (a) a propylene tetramer-alkylated phenol having a boiling range between 560° F. and 700° F., (b) calcium hydroxide in an amount to form a basic sulfurized calcium phenate of the propylene tetramer-alkylated phenol having a calcium content up to about 100% in excess of that present in the corresponding normal calcium phenate, (c) elemental sulfur in an amount of 10 to 200 mol percent, based on calcium and (d) ethylene glycol in a weight ratio to calcium hydroxide of from 1 to about 50, (2) heating the reaction mixture to a temperature between about 200° F. and about 400° F. and under reduced pressure to form said basic sulfurized calcium phenate of propylene tetramer-alkylated phenol and remove water of reaction and a part of the ethylene glycol from the reaction mixture, (3) adding mineral oil diluent and continuing to heat the reaction mixture to remove the remainder of the ethylene glycol therefrom, and (4) passing carbon dioxide into the diluted reaction mixture while maintaining the temperature of said mixture between about 200° F. and about 400° F. for a time sufficient to incorporate into said basic sulfurized calcium phenate product from about 0.2 mol to about 0.6 mol of carbon dioxide per mol of calcium in said product.

5. A lubricating composition comprising a major proportion of mineral lubricating oil and from about 0.5% to about 20%, by weight, on an oil-free basis, of a carbon dioxide derivative of a basic sulfurized calcium alkyl phenate salt prepared by the method which comprises the steps of (1) forming a reaction mixture of (a) a phenolic material selected from the group consisting of alkyl-substituted phenols having up to 30 carbon atoms in any alkyl substituent thereof, and normal calcium salts of said phenols, (b) a calcium base selected from the group consisting of calcium oxide and calcium hydroxide, in an amount sufficient to form a basic sulfurized calcium alkyl phenate having a calcium content up to about 100% in excess of that present in the corresponding normal calcium phenate, (c) elemental sulfur in an amount of from 10 to 200 mol percent based on calcium and (d) a glycol containing less than 6 carbon atoms, the weight ratio of said glycol to said calcium base used being from 1 to about 50, (2) heating the reaction mixture to a temperature sufficient to form said basic sulfurized calcium alkyl phenate salt and remove water and reaction and glycol from the reaction mixture, (3) adding a mineral oil diluent to the reaction mixture and (4) passing carbon dioxide gas into the reaction mixture while maintaining the temperature of said mixture between about 200° F. and about 400° F., for a time sufficient to incorporate into the basic sulfurized calcium alkyl phenate product from about 0.2 mol to about 0.6 mol of carbon dioxide per mol of calcium in said product.

6. A mineral lubricating oil composition according to claim 5, but wherein steps 2 and 3 are conducted by adding at least a part of the mineral oil diluent to the reaction mixture before all of the glycol has been removed from said reaction mixture.

7. A mineral lubricating oil composition according to claim 5, but wherein in steps 2 and 3, the temperature of the reaction mixture is maintained between about 200° F. and about 400° F. and the pressure is below atmospheric.

8. A lubricating composition comprising a major proportion of mineral lubricating oil and from about 0.5% to about 20%, by weight, on an oil-free basis, of a carbon dioxide derivative of a basic sulfurized calcium phenate of propylene tetramer-alkylated phenol, prepared by the method which comprises the steps of: (1) forming a reaction mixture of (a) a propylene tetramer-alkylated phenol having a boiling range between 560° F. and 700° F., (b) calcium hydroxide in an amount to form a basic sulfurized calcium phenate of the propylene tetrameralkylated phenol having a calcium content up to about 100% in excess of that present in the corresponding normal calcium phenate, (c) elemental sulfur in an amount of 10 to 200 mol per cent, based on calcium and (d) ethylene glycol in a weight ratio to calcium hydroxide of from 1 to about 50, (2) heating the reaction mixture to a temperature between about 200° F. and about 400° F. and under reduced pressure to form said basic sulfurized calcium phenate of propylene tetramer-alkylated phenol and remove water of reaction and a part of the ethylene glycol from the reaction mixture, (3) adding mineral oil diluent and continuing to heat the reaction mixture to remove the remainder of the ethylene glycol therefrom, and (4) passing carbon dioxide into the diluted reaction mixture while maintaining the temperature of said mixture between about 200° F. and about 400° F. for a time sufficient to incorporate into said basic sulfurized calcium phenate product from about 0.2 mol to about 0.6 mol of carbon dioxide per mol of calcium in said product.

References Cited in the file of this patent

UNITED STATES PATENTS

| | | |
|---|---|---|
| 2,402,448 | Richards | June 18, 1946 |
| 2,406,041 | Schneider | Aug. 20, 1946 |
| 2,680,096 | Walker et al. | June 1, 1954 |
| 2,736,701 | Neff | Feb. 28, 1956 |
| 2,762,774 | Popkin | Sept. 11, 1956 |
| 2,781,403 | Kane et al. | Feb. 12, 1957 |
| 2,916,454 | Bradley | Dec. 8, 1959 |

FOREIGN PATENTS

| | | |
|---|---|---|
| 549,094 | Canada | Nov. 19, 1957 |
| 554,985 | Canada | Mar. 25, 1958 |